United States Patent [19]
Wilson

[11] Patent Number: 6,050,586
[45] Date of Patent: Apr. 18, 2000

[54] TRAILER AND METHOD

[76] Inventor: Robert L. Wilson, 421 E. 10th St., Cherokee, Okla. 73728

[21] Appl. No.: 09/177,247

[22] Filed: Oct. 22, 1998

Related U.S. Application Data

[63] Continuation of application No. 08/811,112, Mar. 3, 1997, Pat. No. 5,857,831.

[51] Int. Cl.$^7$ ...................................................... B60P 1/00
[52] U.S. Cl. ......................... 280/475; 280/418.1; 280/43; 414/467; 414/498
[58] Field of Search ................................ 280/400, 406.2, 280/407.18, 408, 425.2, 423.1, 441.2, 444, 475, 476.1, 478.1, 491.3, 43, 146, 418, 418.1, 416.1; 414/529, 498, 467

[56] References Cited

U.S. PATENT DOCUMENTS

| | | | |
|---|---|---|---|
| 2,926,930 | 3/1960 | Pease | 280/475 |
| 3,413,014 | 11/1968 | Franz | 280/475 X |
| 5,050,897 | 9/1991 | Strömberg | 280/43 |
| 5,380,029 | 1/1995 | Portilla | 280/418.1 X |

FOREIGN PATENT DOCUMENTS

| | | | |
|---|---|---|---|
| 1112556 | 3/1956 | France | 280/475 |
| 883838 | 7/1953 | Germany | 280/475 |

*Primary Examiner*—Frank E. Werner
*Attorney, Agent, or Firm*—Townsend and Townsend and Crew

[57] ABSTRACT

A trailer and a method for loading a trailer onto a transport vehicle. The trailer is elevated, causing a rear axle assembly of the trailer to pivot from a forward position to a position that is generally normal to the trailer frame. A front wheel axle assembly is rotated upwardly, and the trailer is then subsequently slid/or pushed along a generally planar bed surface of the transport vehicle. The end of the bed surface contacts the rear axle assembly during the sliding process, and with continuing sliding the rear axle assembly moves from a normal position to a rearward position.

25 Claims, 15 Drawing Sheets

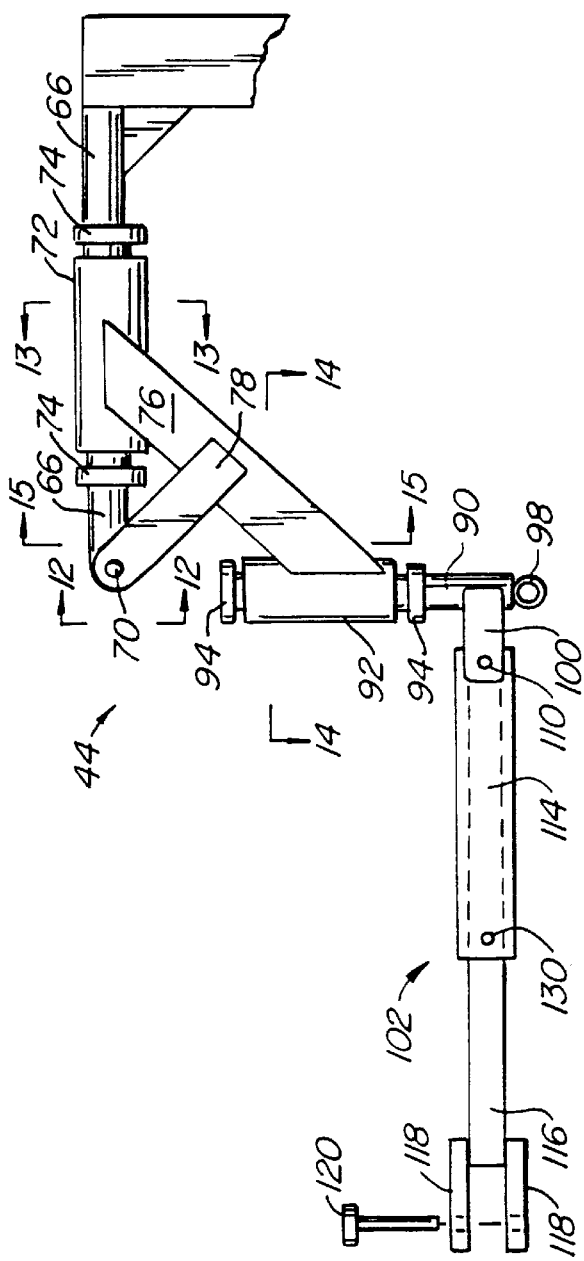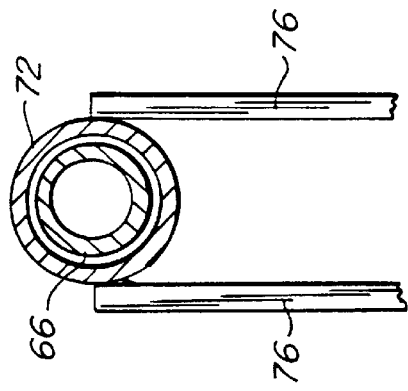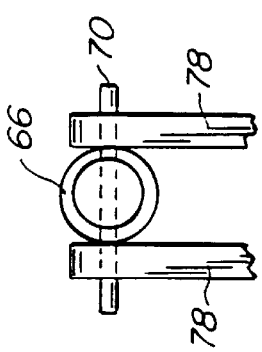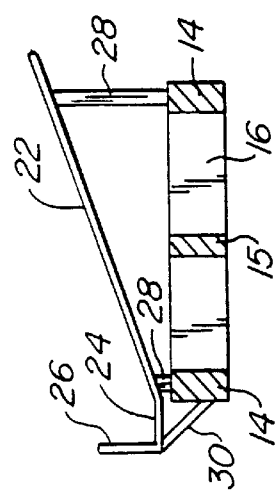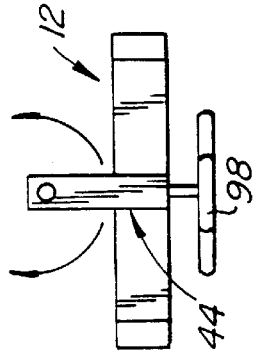

TRAILER AND METHOD

This is a continuation patent application of patent application having Ser. No. 08/811,112, filed Mar. 3, 1997, now U.S. Pat. No. 5,857,831.

BACKGROUND OF THE INVENTION

1. Field of the Invention

The present invention relates to a trailer and a method. More specifically, the present invention provides for a trailer and a method for loading and unloading a trailer from a transport vehicle. The trailer may be employed for any purpose, such as for supporting farm equipment (e.g. combines, etc.) or for any other purpose readily discernible to those skilled in the art.

2. Description of the Prior Art

Trailers with frames to haul headers have been produced and used for many years. In the past headers were towed on trailers behind trucks. However, now harvesters need to tow grain trailers with the header and trailer inside the grain trailer because of the change in the way harvesting equipment is transported. This eliminates the need for an extra truck to tow the header on a header trailer. What is needed and what has been invented is an improved trailer and improved method for loading the trailer onto a transport vehicle.

SUMMARY OF THE INVENTION

The present invention accomplishes its desired objects by broadly providing a method for loading a trailer onto a transport vehicle comprising the steps of:

a) providing a transport vehicle having a generally planar bed surface terminating in a bed edge;

b) providing a trailer having a frame with a rear axle assembly pivotally secured to the frame and in a forward position;

c) elevating the frame, causing the rear axle assembly to pivot from the forward position to a position that is generally normal to the frame;

d) sliding the trailer along the generally planar bed surface until the bed edge contacts the rear axle assembly; and e) continuing the sliding step (d) to move the rear axle assembly from the normal position to a rearward position in order to load the trailer onto the transport vehicle.

The present invention also accomplishes its desired objects by broadly providing a method for transporting a trailer to a desired destination in a transport vehicle comprising the steps of:

a) providing a transport vehicle having a generally planar bed surface terminating in a bed edge;

b) providing a trailer comprising a frame including a front frame portion and a rear frame portion, a front axle assembly rotatably secured to the frame in an operative position (i.e., a ground transport position) including a front wheel rotatably connected thereto and supported by a foundation, and a rear axle assembly including pair of rear axle arms pivotally connected to the frame in a first position and having a pair of rear wheels rotatably connected thereto and supported by a foundation;

c) elevating the trailer of step (b) until the rear wheels are removed from the foundation, causing, the rear axle arms to gravitatively pivot downwardly into a second position;

d) rotating the front axle assembly into a stored position (i.e., a highway transport position) from the operative position;

e) disposing the front frame portion on the generally planar bed surface;

f) sliding the trailer including the front frame portion along the generally planar bed surface;

g) moving the rear axle arms from the second position into a third position by contacting the rear axle arms with the bed edge and continuing the sliding step (f) of the trailer along the generally planar bed surface in order to load the trailer in the transport vehicle; and h) moving the transport vehicle to a desired destination.

The present invention further accomplishes its desired objects by broadly providing a trailer comprising a frame; a rear wheel assembly pivotally connected to the frame; and a front wheel assembly rotatably secured to the frame. The front wheel assembly comprises a first cylindrical member having a transverse opening; and a first sleeve member rotatably mounted on the first cylindrical member. The trailer also includes a second cylindrical member; and a spindle coupled to the second cylindrical member for rotatably supporting at least one wheel. A second sleeve member is rotatably mounted on the second cylindrical member; and at least one sleeve bracket is connected to the first sleeve member and to the second sleeve member. At least one pin bracket is secured to the sleeve bracket and has a structure defining a bracket opening. A pin member passes through the bracket opening and through the transverse opening.

It is therefore an object of the present invention to provide a wheel assembly.

It is another object of the present invention to provide a trailer.

It is yet another object of the present invention to provide a method for loading a trailer onto a transport vehicle and a method for transporting a trailer to the desired destination.

These, together with the various ancillary objects and features which will become apparent to those skilled in the art as the following description proceeds, are attained by this novel trailer and method, a preferred embodiment thereof shown with reference to the accompanying drawings, by way of example only, wherein:

BRIEF DESCRIPTION OF THE DRAWINGS

FIG. 9 is a side elevational view of the front wheel assembly in the down or ground transport position;

FIG. 10 is a front elevational view of the front wheel assembly with the arrows indicating possible paths of rotation about or around a longitudinal axis of the trailer to place the front wheel assembly in the dotted line representation in FIG. 8 or in the highway transport position which is for when the trailer is loaded into a transport vehicle;

FIG. 11 is a vertical sectional view taken in direction of arrows along the plane of line 11—11 in FIG. 7;

FIG. 12 is a front elevational view taken in direction of the arrows and along the plane of line 12—12 in FIG. 9;

FIG. 13 is a vertical sectional view taken in direction of the arrows and along the plane of line 13—13 in FIG. 9;

DETAILED DESCRIPTION OF THE INVENTION

Figure 1:
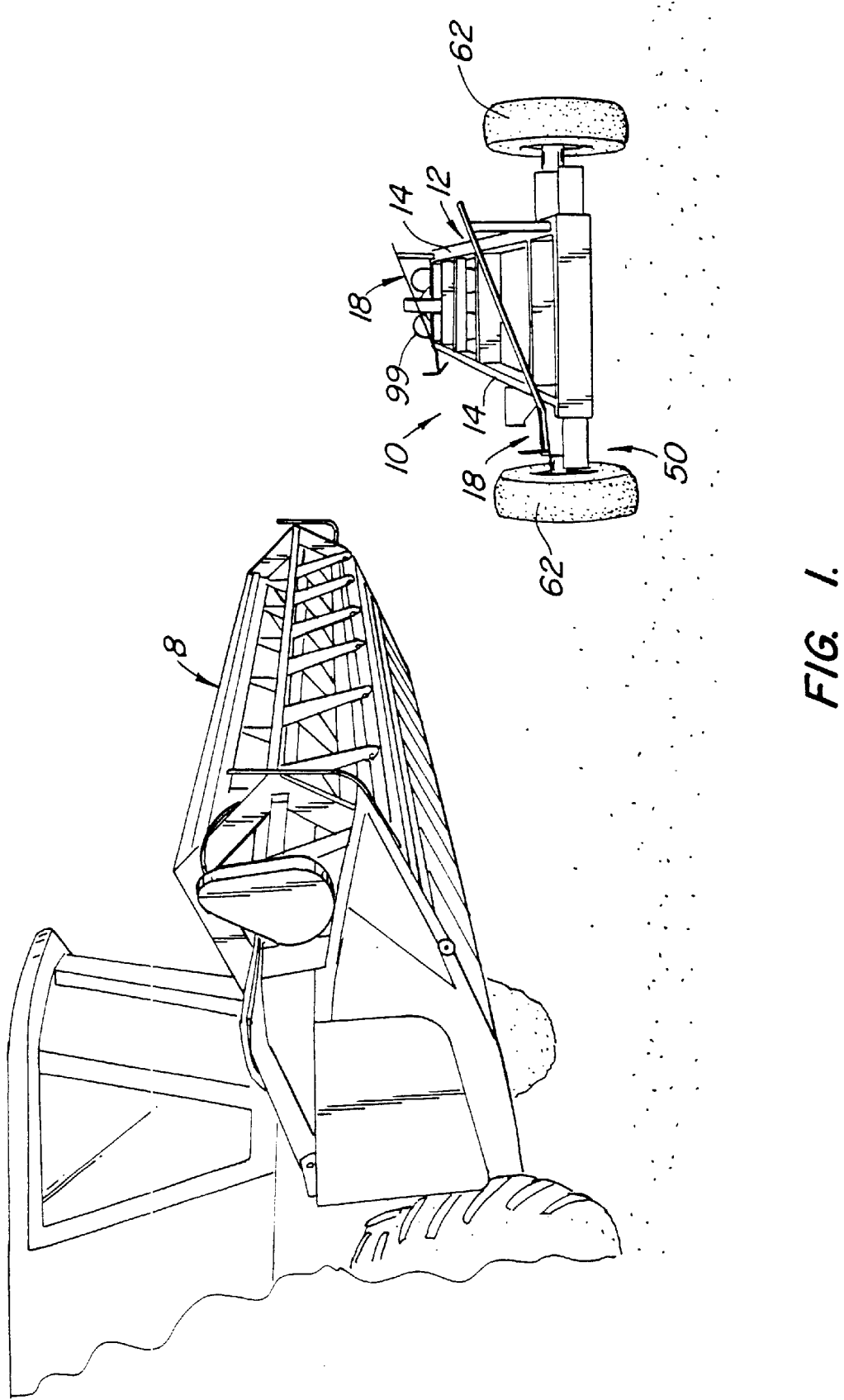
FIG. 1 is an end perspective view of the trailer with a combine header in the process of being loaded upon the trailer.
Figure 2:
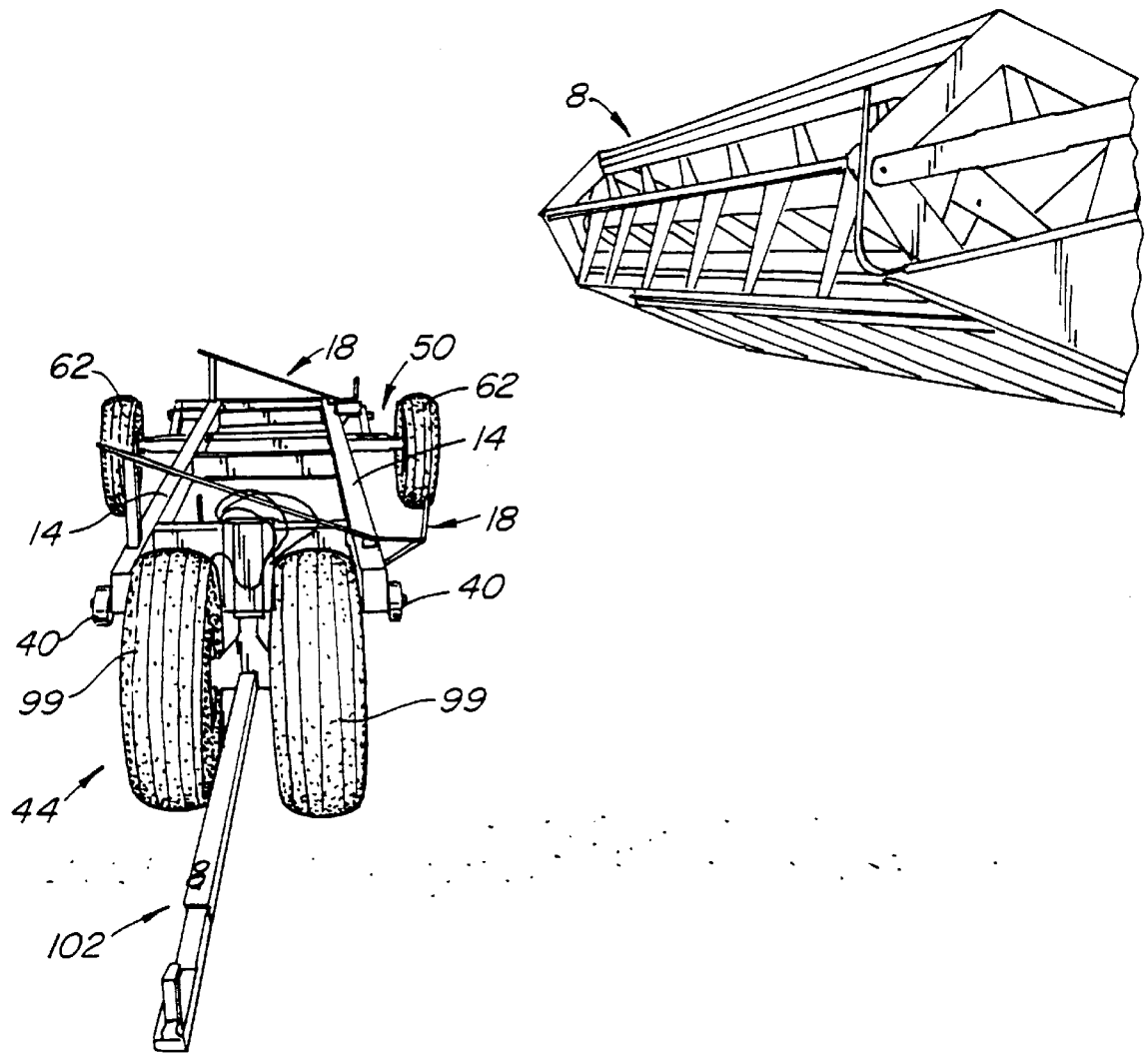
FIG. 2 is an end perspective view of an end of the trailer opposite to the end depicted in FIG. 1.
Figure 3:
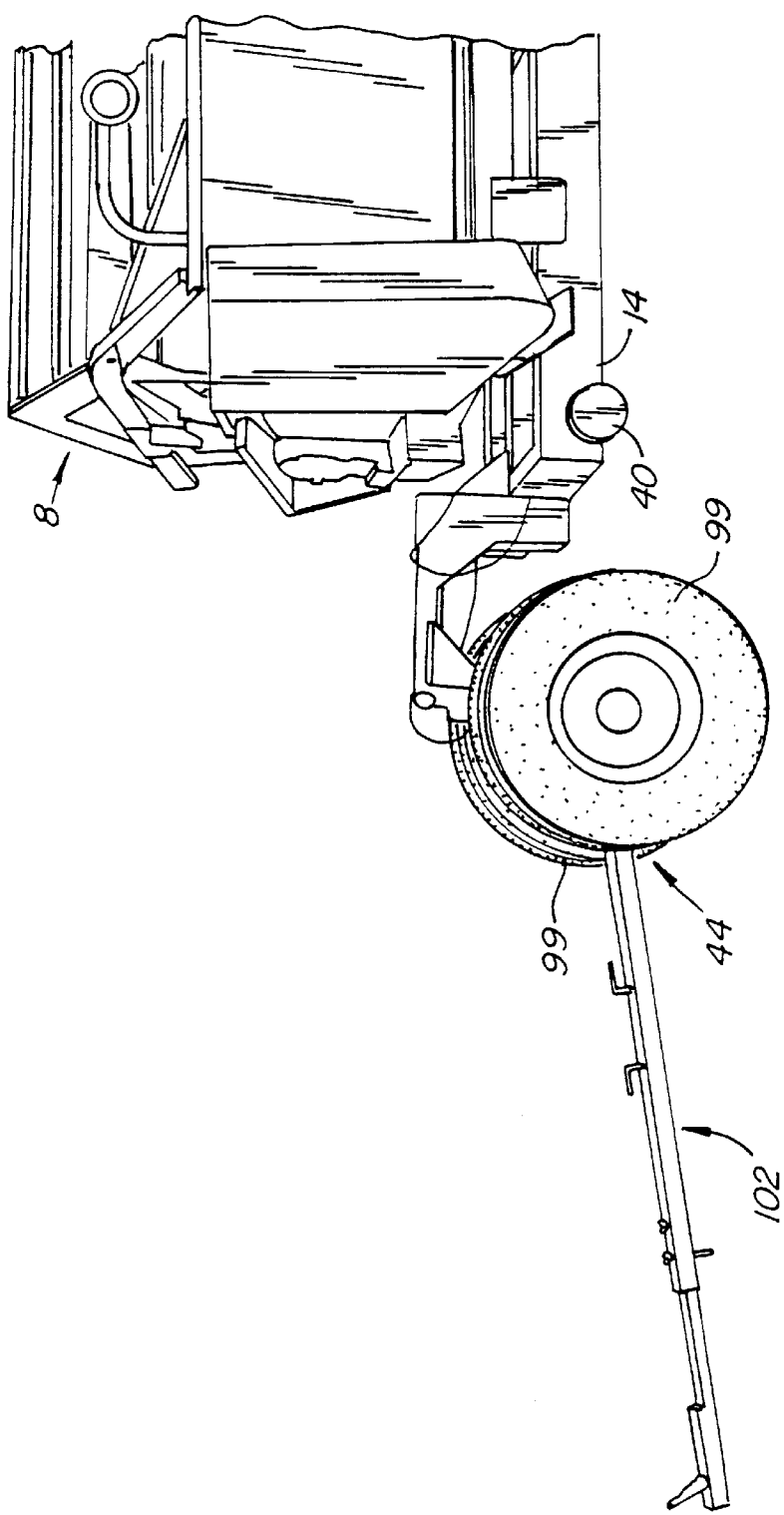
FIG. 3 is a side perspective view of the front wheel axle assembly including a hitch member secured thereto.

Referring in detail now to the drawings wherein similar parts of the invention are identified by like reference numerals, there is seen a trailer, generally illustrated as 10, which is preferably for supporting and hauling combine headers, generally illustrated as 8, or any other suitable farm equipment. The trailer 10 may be loaded into and out of a transport vehicle, generally illustrated as 80. The transport vehicle 80 preferably has a generally planar bed surface 82 terminating in a bed edge 84 and supporting a pair of rails 86—86.

The trailer 10 comprises a frame, generally illustrated as 12, having a pair of longitudinal frame members 14-14, a center frame member 15, and a plurality of cross frame members 16 transversely extending across the frame 12 and connected to the longitudinal frame members 14—14. The frame 12 further has a pair of support frame assemblies 18—18 which are the primary support for the combine header 8.

Each support frame assembly 18, as best shown in FIG. 11, includes an acutely sloping frame section 22, a horizontal frame section 24 internally bound to the acutely sloping frame section 22, and an upright frame section 26 integrally bound to the horizontal frame section 24 and generally normal with respect thereto. Each support frame assembly 18 also includes upstanding sections 28—28 connected to and supported by longitudinal frame members 14—14 to support the acutely sloping frame section 22 in a sloping posture as shown in FIG. 11. A cross member 30 is provided and is secured to one of the longitudinal frame members 14 and to the horizontal frame section 24 (see FIG. 11 again).

The frame 12 consists of a front frame portion, generally illustrated as 34, and a rear frame portion, generally illustrated as 38. A pair of roller members 40—40 rotatably mounts to the pair of longitudinal frame members 14—14 in the front frame portion 34. The roller members 40—40 roll along the pair of rails 86—86, which are supported by the planar bed surface 82, as the trailer 10 is being loaded onto or unloaded off of the transport vehicle 80. A front axle assembly, generally illustrated as 44, is secured to the frame 12, also in the front frame portion 34 thereof. A pair of rods 48—48 is connected to the pair of longitudinal frame members 14—14 in the rear frame portion 38. A rear axle assembly, generally illustrated as 50, is pivotally supported by the pair of rods 48—48.

The rear axle assembly 50 includes a pair of axle arms 52—52 that respectively terminate in a hub or sleeve 54. The sleeves 54—54 mount on the rods 48—48 such that the rear axle assembly 50 may freely pivotally move through and into various positions which will be identified below. The rear axle assembly 50 also includes a rear axle 58 secured to the axle arms 52—52 for rotatably supporting a pair of rear wheels 62—62.

Figure 4:
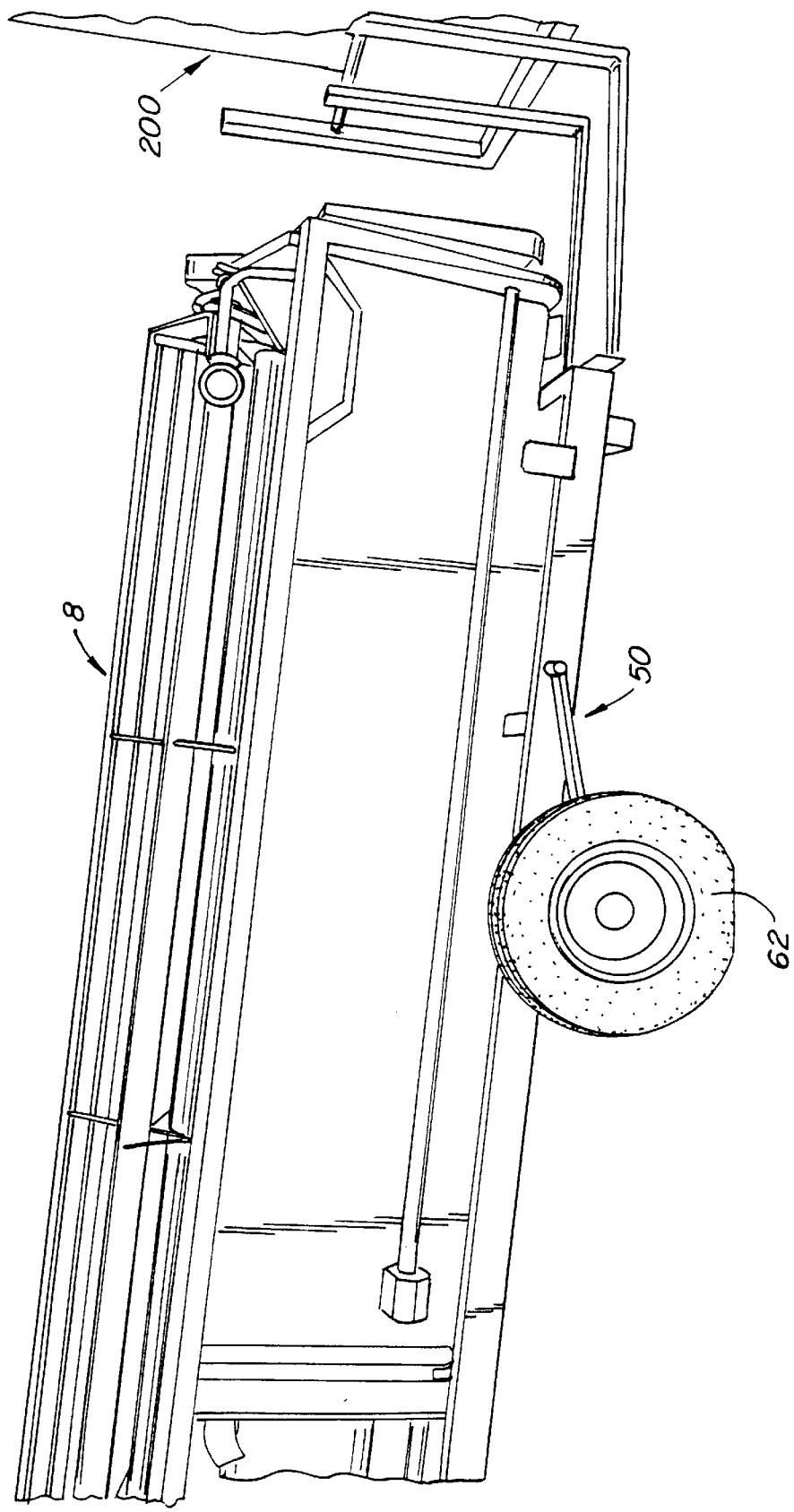
FIG. 4 is a side elevational view of the trailer loaded with a combine header and with the rear axle assembly disposed in a forward position (i.e. the ground transport position) and with a forklift apparatus in the process of being positioned to lift the trailer to load same into a transport vehicle.
Figure 5:
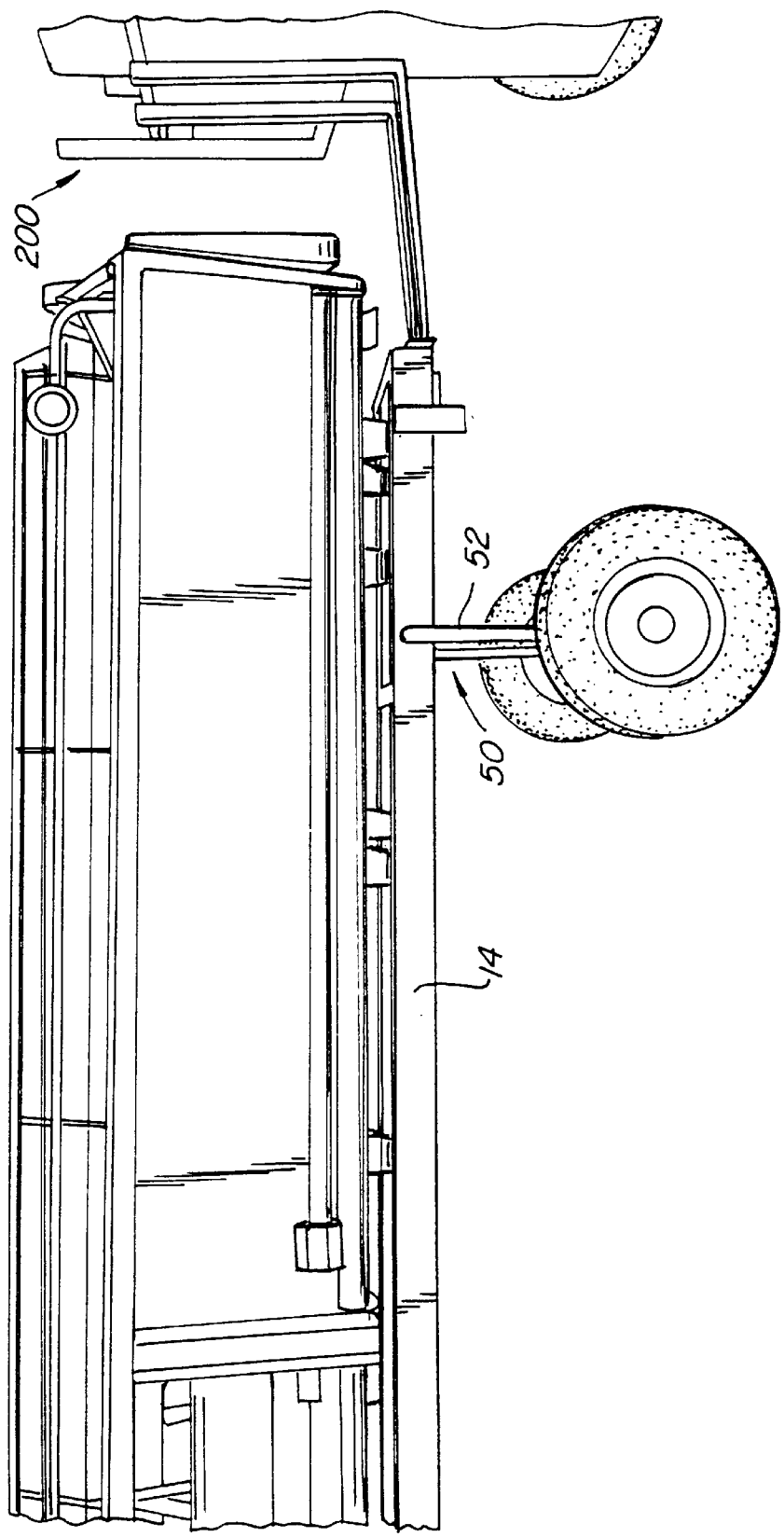
FIG. 5 is a side elevational view of the trailer loaded with the combine header after the forklift apparatus has lifted the rear frame portion of the trailer and after the rear axle assembly has moved from the forward position (i.e. the ground transport position) to a position that is generally normal or perpendicular to the frame of the trailer.
Figure 6:
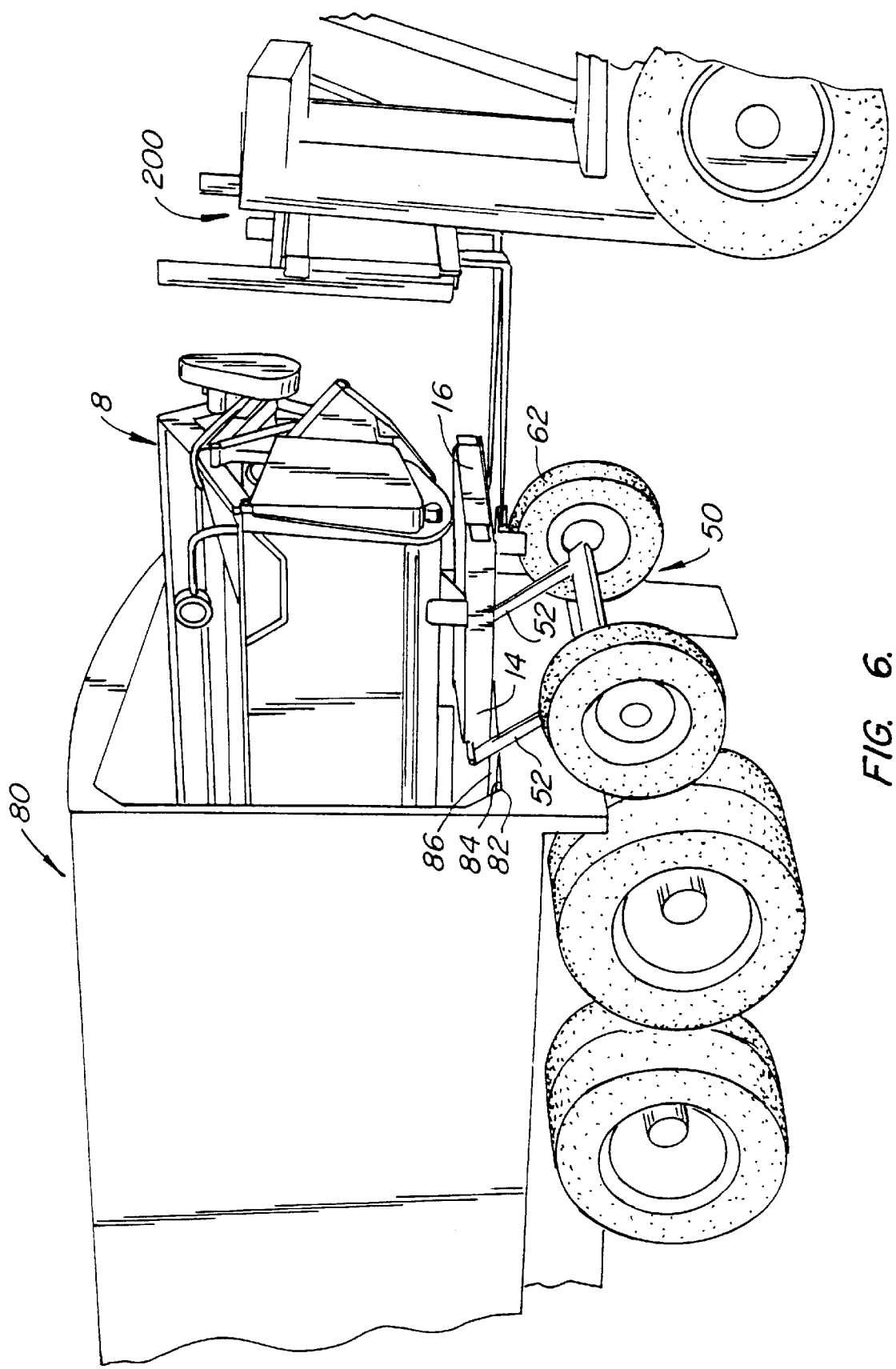
FIG. 6 is a side perspective view of the loaded trailer of FIG. 5 in the process of being slid along a generally planar bed surface of a transport vehicle with the rear axle assembly engaging a bed edge such that as the forklift apparatus continues to push and/or slide the loaded trailer, the rear axle assembly is being pivotally moved from the normal or perpendicular position of FIG. 5 to a rearward position (i.e. a highway transport position)
Figure 21:
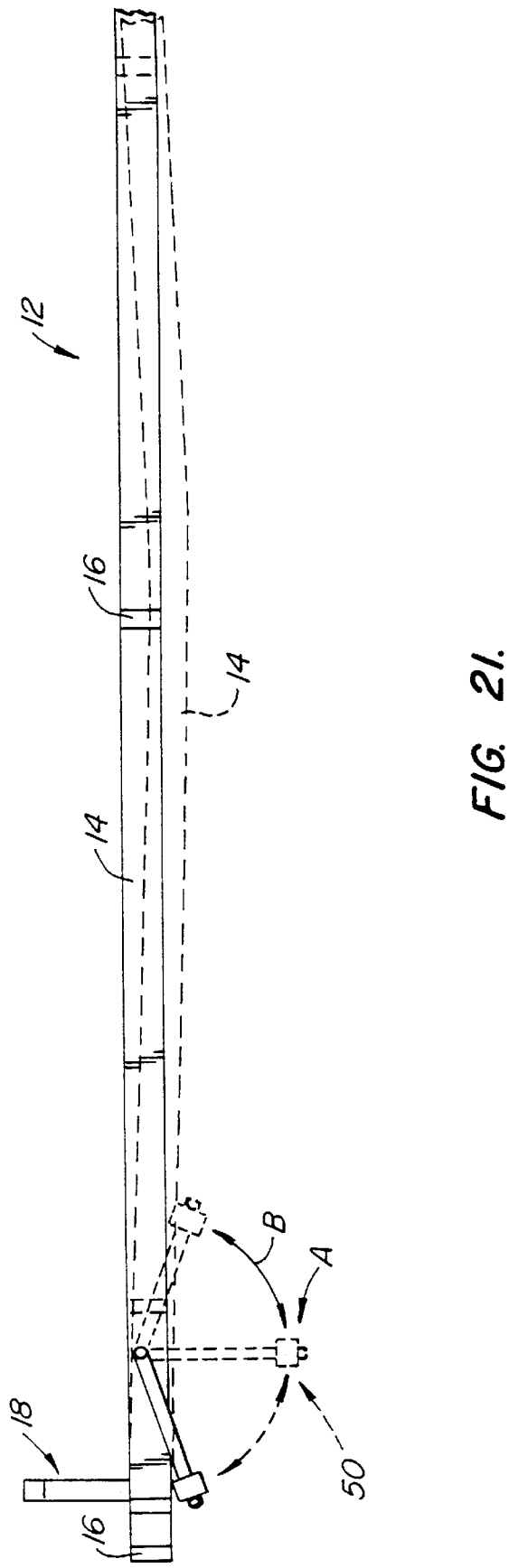
FIG. 21 is a partial side elevational view of the trailer with the dotted line representation being the bending or bowing of the trailer frame in the event that the rear axle assembly is not rotated from a rearward position (i.e. the highway transport position) to a forward position (i.e. the operative or ground transport position) which will maintain and keep the trailer frame straight in order to transport the trailer on the highway without the trailer frame flexing during highway travel.
Figure 22:
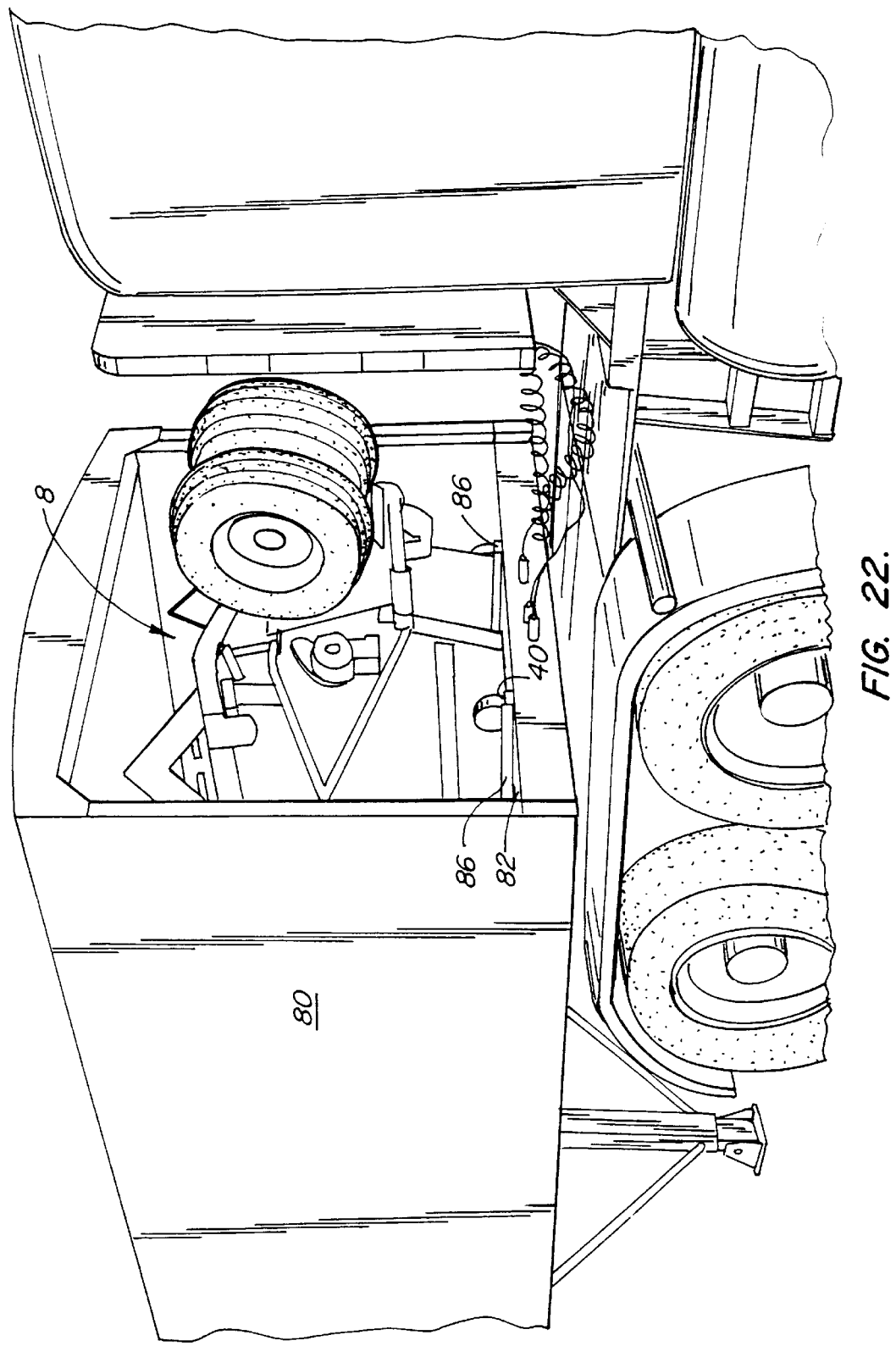
FIG. 22 is a partial perspective view of the trailer loaded with a combine header and after having been loaded into a transport vehicle with the front wheel assembly in the up or highway transport position and with the roller members rotatably resting on a pair of rails that are supported by a planar bed surface of the transport vehicle.
Figure 23:
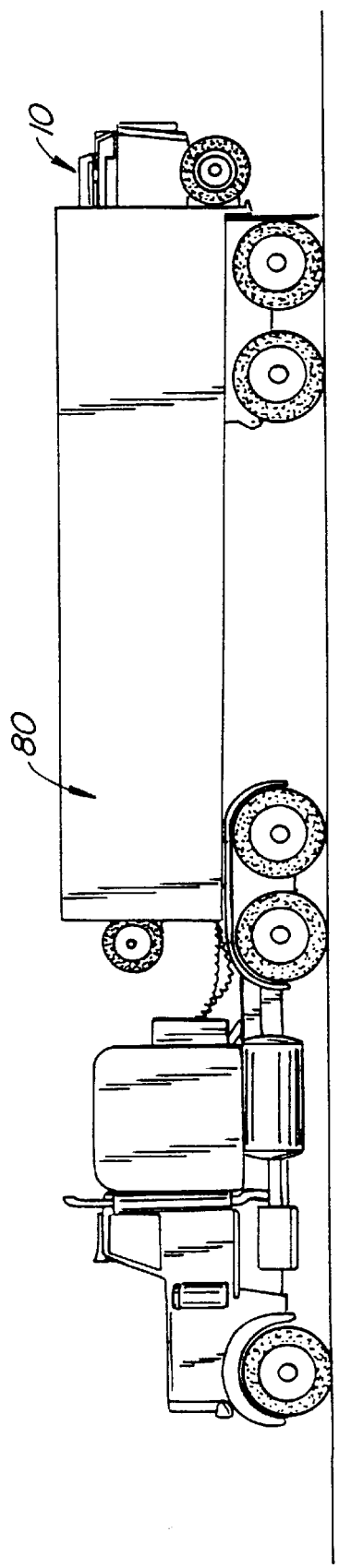
FIG. 23 is a side elevational view of a transport vehicle transporting the trailer loaded with a combine header.

The rear axle assembly 50 has three (3) primary positions. The operative or ground transport position (i.e. the forward position) is the position represented by the solid slide representation of the rear axle assembly 50 in FIGS. 4 and 8. The ground transport position of the rear axle assembly 50 is to prevent the frame 12 (especially the longitudinal frame members 14—14) from bending or bowing from the heavy load of the combine header 8 or the like when the trailer 10 is being towed. The ground transport position also gives the trailer 10 more stability as it is being towed down a highway. The rearward or highway transport position (i.e. the position where the trailer 10 is loaded onto the transport vehicle 80) is represented by the solid representation of the rear axle assembly 50 in FIG. 21. The highway transport position results after the axle arms 52—52 have contacted the bed edge 84 and after a loading apparatus (e.g. a forklift apparatus 200 in FIGS. 4 and 5) continues to push and slide the trailer 10 along the planar bed surface 82 of the transport vehicle 80. During the sliding process and as will be further explained below, the roller members 40—40 are rolling on the pair of rails 86—86 after being rotatably placed thereon in order to facilitate the sliding (and the loading or unloading) process. The third primary position for the rear axle assembly 50 is a position where the rear axle assembly 50, more specifically the axle arms 52—52, are in a normal or perpendicular position with respect the frame 12 including the longitudinal frame members 14—14 associated therewith. This third position as best shown in FIG. 21, results after a lifting apparatus (e.g. the forklift 200) has lifted and elevated the trailer 10, particularly the rear frame portion 38 of the trailer 10. When the lifting apparatus commences to lift the rear frame portion 38 of the trailer 10, the rear axle assembly 50 commences to move in the path of and in the direction of arrow B in FIG. 21. When the lifting or elevating apparatus has lifted the rear frame portion 38 high enough, the rear axle assembly 50 reaches the position of position A in FIG. 21. Stated alternatively, when the rear frame portion 38 is high enough off of a foundation or the ground, the weight of the rear wheels 62—62 causes the rear axle assembly 50 (particularly the axle arms 52—52) to gravitatively pivot downwardly into the position A of FIGS. 8 and 21. As previously indicated, it is from this position A that the rear axle assembly 50 may be moved into the rearward or highway transport position by disposing the roller members 40—40 on the rails 86—86 (after the front wheel assembly 44 has been rotated about a longitudinal axis of the trailer 10), and subsequently pushing and/or sliding the trailer 10 along the planar bed surface 82 (with the concomitant effect of the roller members 40—40 rolling along the rails 86—86) until the axle arms 52—52 contact the bed edge 84; whereafter and with continual pushing and/or sliding of the trailer 10 by the pushing and/or lifting apparatus, the rear axle assembly 50 (i.e. the axle arms 52—52) are moved from the position A into the rearward or highway transport position. The bed edge 84 functions as an abutment or stop member in that the axle arms 52—52 abut against the bed edge 84 while the trailer 10 is being slid and/or pushed along the planar bed surface 82.

Figure 15:
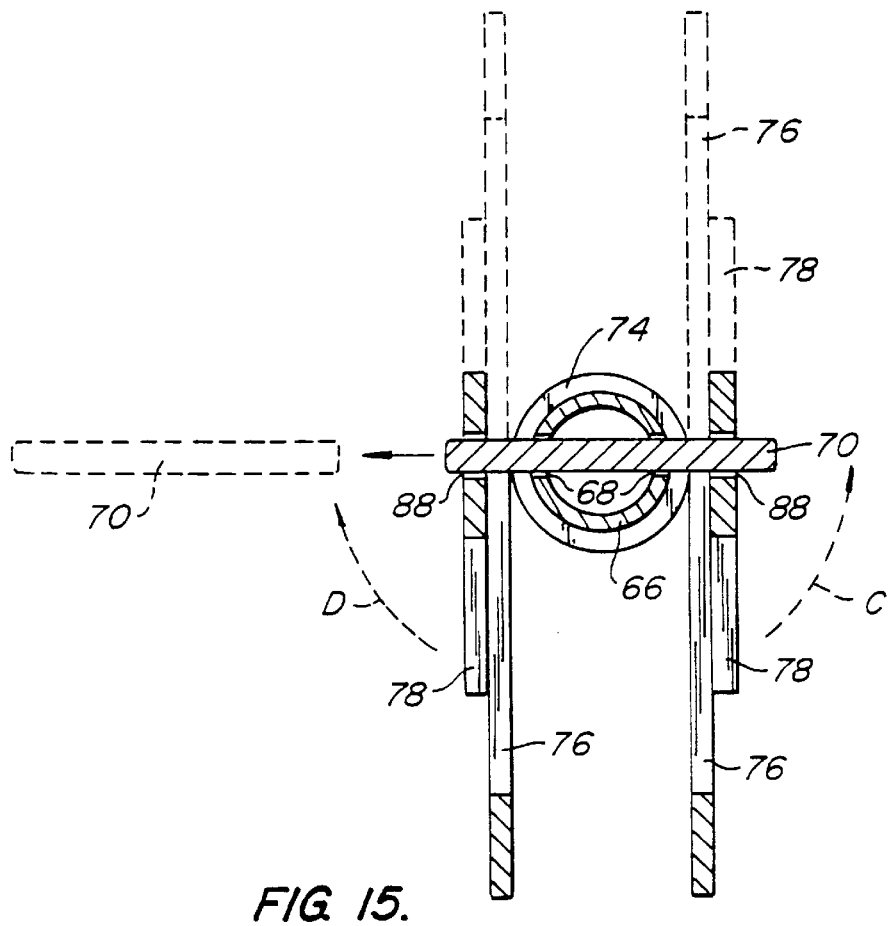
FIG. 15 is a vertical sectional view taken in direction of the arrows and along the plane of line 15—15 in FIG. 9.
Figure 16:
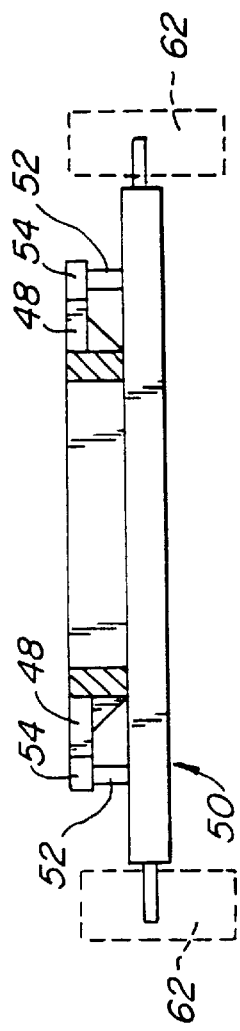
FIG. 16 is a vertical sectional view taken in direction of the arrows and along the plane of line 16—16 in FIG. 7.
Figure 17:
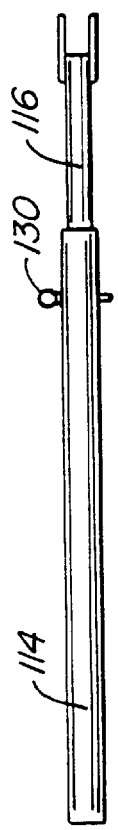
FIG. 17 is a side elevational view of the hitch member having a female hitch section telescopically receiving a male hitch section and pinned together by a pin.

The front wheel assembly 44, as best shown in FIG. 9, includes a shaft or cylindrical member 66 which is preferably horizontally disposed. Cylindrical member 66 has a transverse bore or opening 68 for removable receiving a pin 70. A sleeve 72 is slideably and rotatably mounted to and around the cylindrical member 66. A pair of collars 74—74 is secured to and around the cylindrical member 66 to limit the longitudinal movement of sleeve 72. A pair of sleeve brackets 76—76 is secured to the sleeve 72 as best shown in FIG. 13. A pair of pin brackets 78—78 is respectively connected to the sleeve brackets 76—76 as best shown in FIGS. 9 and 15. Each pin bracket 78 has an opening 88 that is capable of being aligned with the transverse opening 68 such that the pin 70 may pass through the—openings 68 and 88.

Figure 14:
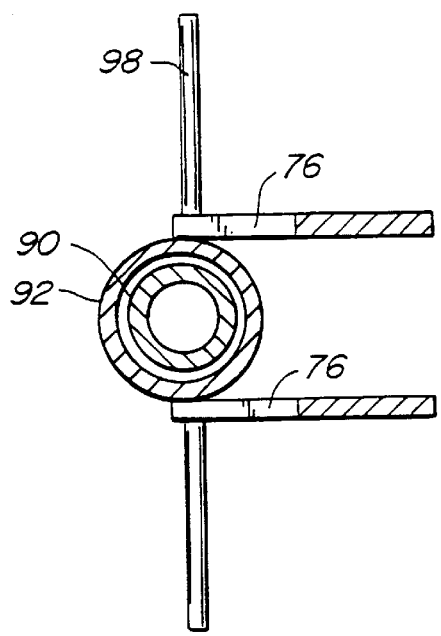
FIG. 14 is a horizontal sectional view taken in direction of the arrows and along the plane of line 14—14 in FIG. 9.
Figure 18:
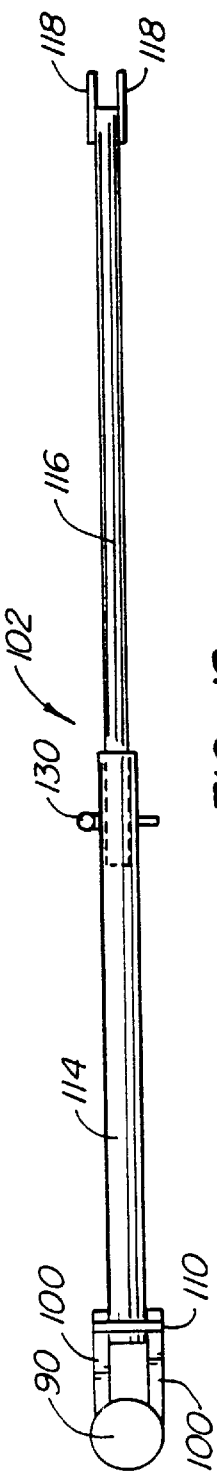
FIG. 18 is a side elevational view of the hitch member of FIG. 17 after the male hitch section has been slideably extended from the female hitch section and pinned together by a pin to affix the female hitch section and the male hitch section together.
Figure 19:
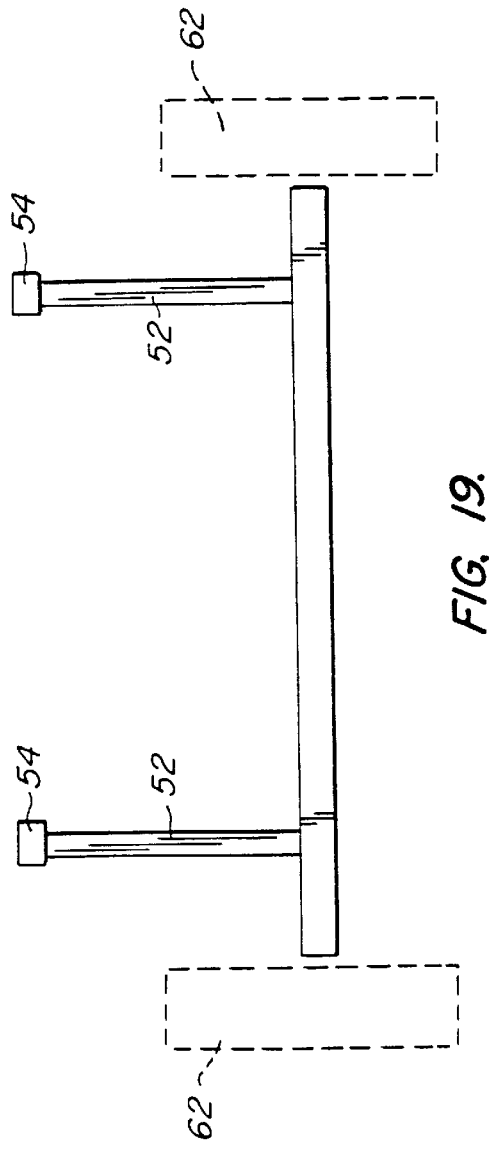
FIG. 19 is a top plan view of the rear axle assembly.
Figure 20:
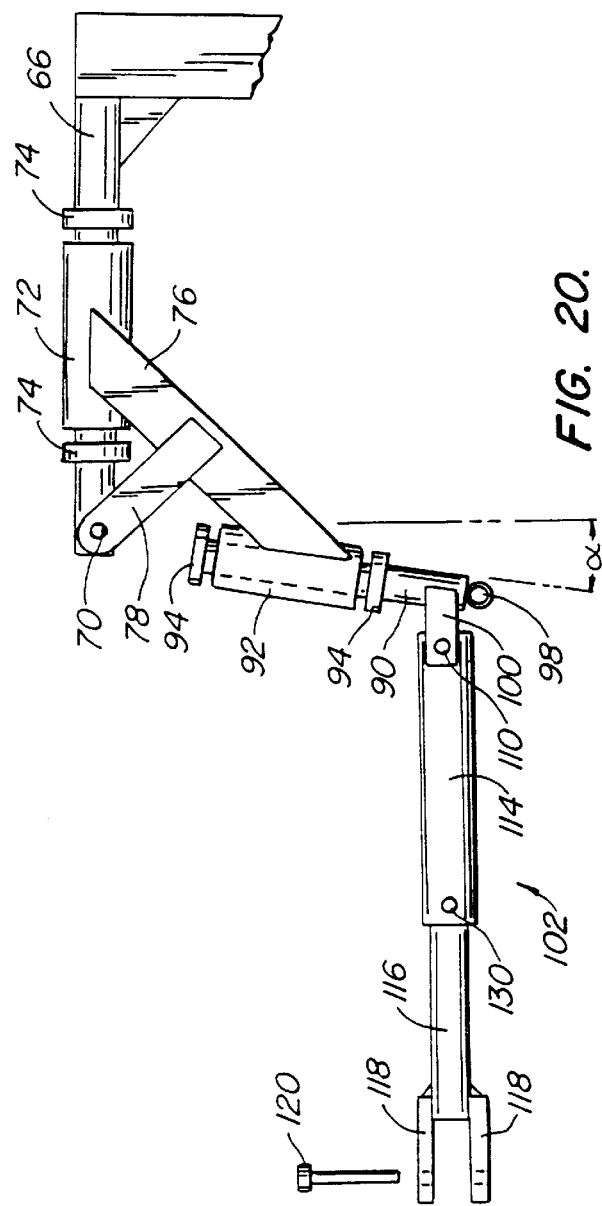
FIG. 20 is a side elevational view of the front wheel axle assembly with the generally upright cylindrical member sloped at an angle $\alpha$ forward to prevent the trailer from wobbling when being towed.

The front wheel assembly 44 also includes a generally upright shaft or cylindrical member 90. Preferably and as best shown in FIG. 20, the cylindrical member 90 is slanted or sloped forward from a vertical plane at an angle ∝ to prevent the trailer 10 from wobbling when being towed. The angle ∝ ranges from about 1 to 10 degrees, more preferably from about 3 to about 5 degrees. A sleeve 92 is slideably and rotatably mounted to and around the cylindrical member 90. A pair of collars 94—94 is secured to and around the cylindrical member 90 to limit the longitudinal movement of sleeve 92. The sleeve brackets 76—76 are connected to the sleeve 92 as best shown in FIG. 14. A spindle 98 is secured to the bottom of the cylindrical member 90 for rotatably supporting a pair of front wheels 99—99. A pair of spaced hitch brackets 100—100 connect to the cylindrical member 90 between the spindle 98 and the lowermost collar 94 in order to releasable connect a hitch assembly, generally illustrated as 102, to the front wheel assembly 44 with the aid of a pin 110 (see FIG. 18).

The hitch assembly 102 includes a female section 114 and a male section 116 telescopically engaging the female section 114 and terminating in a pair of spaced plates 118—118, each including an aperture (not shown) where through a hitch pin 120 may pass for hooking the trailer 10 to a tow vehicle. The hitch assembly 102 also includes a pin 130 that releasably engages the female section 114 to the male section 116.

The front wheel assembly 44 may be rotated from the solid line position (i.e. the ground transport position) depicted in FIGS. 9 and 15 to the dotted line position (i.e. the stored or highway transport position) depicted in FIGS. 8 and 15 by removing the pin 70 from within the openings of 68 and 88; and subsequently rotating the sleeve 72 (including the dependently attached brackets 70, 76, cylindrical member 90 and its associated sleeve 92, along with the spindle 98 and the front wheels 99) in direction of arrow C or arrow D in FIG. 15 and about a longitudinal axis of the trailer 10. After the front wheel assembly 44 has reached its elevated position, the pin 70 may be reinserted through the opening 68 and 88 in order to hold the front wheel assembly 44 in its elevated position.

Continuing to refer to the drawings for operation of the invention and the method of loading the trailer 10 onto a transport vehicle 80, the transport vehicle 80 is obtained with the generally planar bed surface 82 that terminates in the bed edge 84. The trailer 10 is supported by the ground with the rear axle assembly 50 in the forward or ground transport position. The trailer 10 is then elevated by any suitable lifting apparatus, such as forklift 200.

Figure 8:
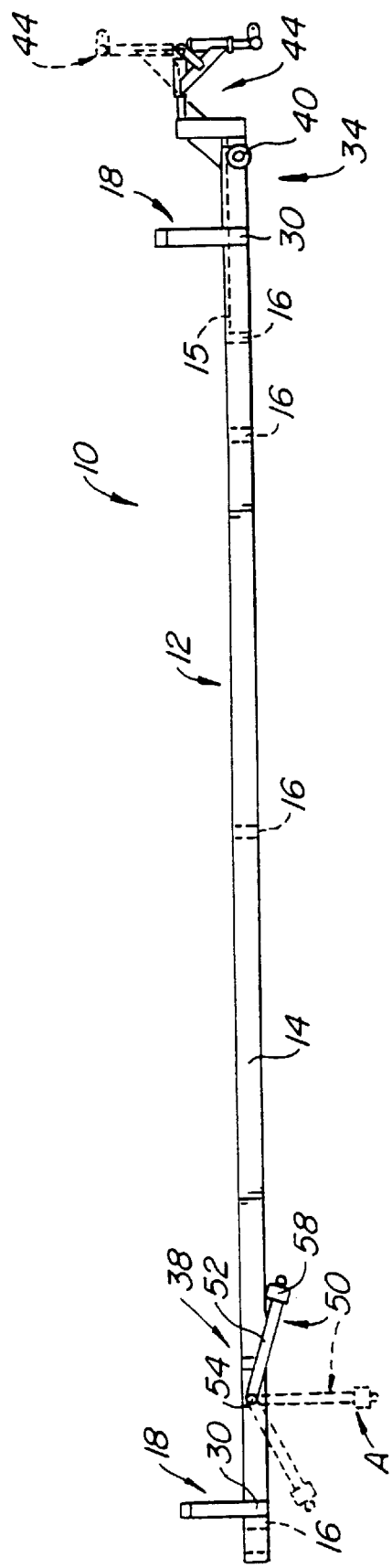
FIG. 8 is a side elevational view of the trailer of FIG. 7 with the dotted line representation of the front wheel axle assembly and the rear axle assembly representing the highway transport position.

After the trailer 10 has been elevated, the front wheel assembly 44 is to be rotatably pivoted from the ground transport position (as shown in FIG. 9) to the highway transport position, as best shown by the dotted line representations in FIGS. 8 and 15. To elevate the front wheel assembly 44, pin 70 is removed from within the openings 68 and 88 (see FIG. 15); this unlocks the front wheel assembly 44 and permits the sleeve 72 to either rotate clockwise (i.e. in direction of arrow D in FIG. 15) or counter clockwise (i.e. in direction of arrow C in FIG. 15). Such rotation is conveniently performed either by grasping the front wheel assembly 44 at a convenient location (e.g. at the sleeve 92 or at the hitch assembly 102) and counter clockwise or clockwise rotating and moving the following elements or parts of the front wheel assembly 44 about a longitudinal axis of the trailer lo: brackets 76 and 78, sleeve 92, cylindrical member 90, the spindle 98, the front wheels 99—99, brackets 100—100 and the hitch assembly 102. After the front wheel assembly 44 has been rotated approximately 180 degrees, or into a position which is generally diametrically opposite (or the mirror image of) the ground transport position, the pin is subsequently slid through the openings 68 and 88 (after the openings 68 and 88 have been realigned) to affix the front wheel assembly 44 in the highway transport position, or in the position represented by dotted lines in FIGS. 8 and 15.

When the trailer 10 including its associated frame 12 is lifted, the rear axle assembly 50 pivots from the forward position to the position A that is generally normal to the frame 12 (see in FIGS. 8 and 21). The roller members 40—40 are disposed on the rails 86—86, and subsequently the trailer 10 is pushed and/or slid along the generally planar bed surface 82 until the bed edge 84 comes in contact with the rear axle assembly 50; more specifically until the bed edge 84 comes in contact with the axle arms 52—52 of the rear axle assembly 50.

After the rear axle assembly 50 including its associated axle as 52—52 have come in contact with the bed edge 84, the trailer 10 is continually pushed/slid along the general planar surface 82 to cause the rear axle assembly 50 to move from the normal position (i.e. the position A in FIGS. 8 and 21) to a rearward position or highway transport position which is represented by the dotted line representation of the rear axle assembly 50 in FIG. 21. The sliding of the trailer 10 along the planar bed surface 82 has the associated affect of causing the roller members 40—40 to roll on the rails 86—86. Obviously, the roller members 40—40 may be employed without the rails 86—86 such that the trailer 10 may be loaded onto the transport vehicle 80 by merely rolling the roller members 40—40 along the planar bed surface 82.

Figure 7:
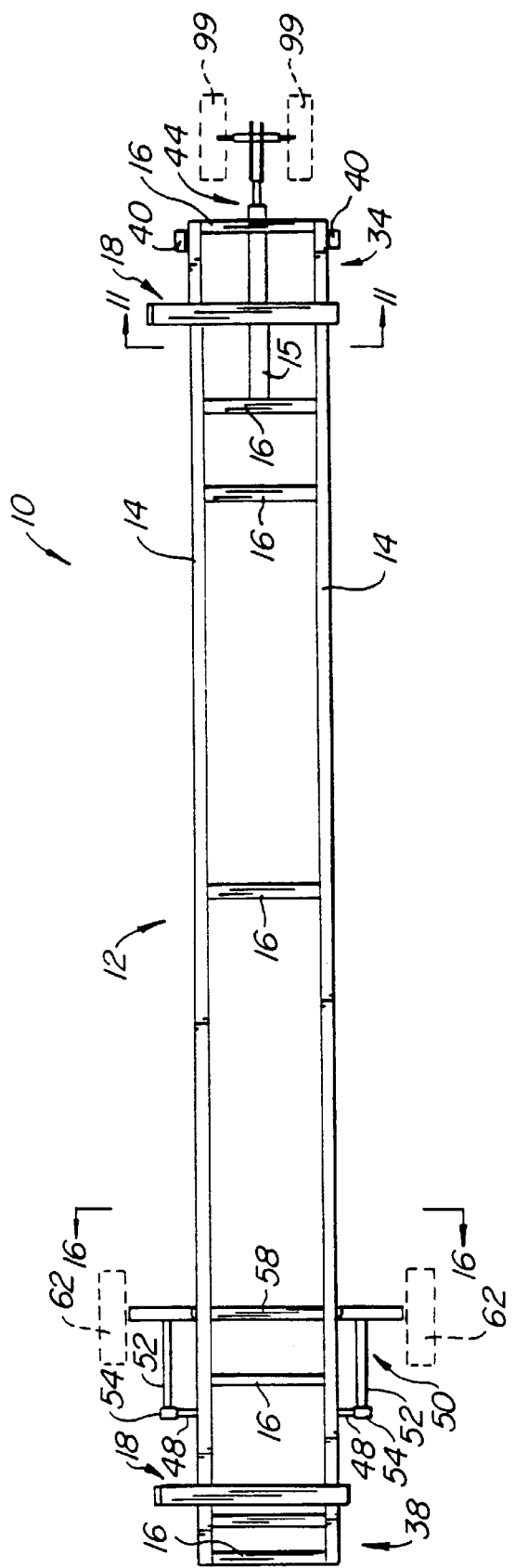
FIG. 7 is a top plan view of the trailer of the present invention.

After the trailer 10 has been loaded onto the transport vehicle 80, the transport vehicle 80 may be moved to a desired destination, where the trailer 10 may be conveniently unloaded from the transport vehicle 80 by merely reversing the forgoing steps. Unloading would include rolling the roller members 40—40 along the rails 86—86, and causing the pivotation of the rear axle arms 52—52 from the rearward position (or the highway transport position) to the position A. The rear wheels 62—62 are then placed on a foundation or ground and the rear axle arms 52—52 are caused to be moved from position A to the ground transport position as best shown in FIGS. 7 and 8 by the solid line representation of the axle arms 52—52.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without department from the scope of the invention as set forth.

What is claimed is:

1. A trailer comprising a frame; a rear wheel assembly pivotally connected to the frame; and a front wheel assembly rotatably secured to the frame, said front wheel assembly comprising a first cylindrical member having a transverse opening; a first sleeve member rotatably mounted on said first cylindrical member; a second cylindrical member; a towbar pivotally connected to the second cylindrical member; a spindle coupled to said second cylindrical member for rotatably supporting at least one wheel; a second sleeve member rotatably mounted on said second cylindrical member; at least one sleeve bracket connected to said first sleeve member and to said second sleeve member; at least one pin bracket secured to said sleeve bracket and having a structure defining a bracket opening; and a pin member passing through said bracket opening and through said transverse opening.

2. The trailer of claim 1 wherein said frame comprises a pair of longitudinal frame members and a pair of rollers rotatably supported by said pair of longitudinal frame members.

3. The trailer of claim 2 additionally comprising a pair of support frame assemblies supported by said pair of longitudinal frame members.

4. The trailer of claim 1 additionally comprising a pair of rods secured to said frame for pivotally supporting said rear wheel assembly, and said rear wheel assembly comprising a pair of sleeves rotatably secured to said pair of rods, and a pair of axle arms secured to said pair of sleeves, and a rear axle coupled to said pair of axle arms.

5. The trailer of claim 1 wherein said second cylindrical member is sloped from a plane at an angle $\alpha$.

6. The trailer of claim 5 wherein said angle $\alpha$ ranges from about 1 degree to 10 degrees.

7. The trailer of claim 5 wherein said angle $\alpha$ ranges from about 3 degrees to about 5 degrees.

8. The trailer of claim 1 additionally comprising a pair of first collars secured to said first cylindrical member such that said first sleeve member is rotatably disposed therebetween.

9. The trailer of claim 8 additionally comprising a pair of second collars secured to said second cylindrical member such that said second sleeve member is rotatably disposed therebetween.

10. The trailer of claim 9 additionally comprising at least one hitch bracket connected to said second cylindrical member.

11. The trailer of claim 8 additionally comprising at least one hitch bracket connected to said second cylindrical member.

12. The trailer of claim 1 additionally comprising a pair of collars secured to said second cylindrical member such that said second sleeve member is rotatably disposed therebetween.

13. The trailer of claim 12 additionally comprising at least one hitch bracket connected to said second cylindrical member.

14. The trailer of claim 1 additionally comprising at least one hitch bracket connected to said second cylindrical member.

15. A wheel assembly comprising a first cylindrical member having a transverse opening; a first sleeve member rotatably mounted on said first cylindrical member; a second cylindrical member; a spindle coupled to said second cylindrical member for rotatably supporting at least one wheel; a second sleeve member rotatably mounted on said second cylindrical member; at least one sleeve bracket connected to said first sleeve member and to said second sleeve member; at least one pin bracket secured to said sleeve bracket and having a structure defining a bracket opening; and a pin member passing through said bracket opening and through said transverse opening.

16. The wheel assembly of claim 15 wherein said second cylindrical member is sloped from a plane at an angle $\alpha$.

17. The wheel assembly of claim 16 wherein said angle $\alpha$ ranges from about 1 degree to 10 degrees.

18. The wheel assembly of claim 16 wherein said angle $\alpha$ ranges from about 3 degrees to about 5 degrees.

19. The wheel assembly of claim 15 additionally comprising a pair of first collars secured to said first cylindrical member such that said first sleeve member is rotatably disposed therebetween.

20. The wheel assembly of claim 19 additionally comprising a pair of second collars secured to said second cylindrical member such that said second sleeve member is rotatably disposed therebetween.

21. The wheel assembly of claim 20 additionally comprising at least one hitch bracket connected to said second cylindrical member.

22. The wheel assembly of claim 19 additionally comprising at least one hitch bracket connected to said second cylindrical member.

23. The wheel assembly of claim 15 additionally comprising a pair of collars secured to said second cylindrical member such that said second sleeve member is rotatably disposed therebetween.

24. The wheel assembly of claim 23 additionally comprising at least one hitch bracket connected to said second cylindrical member.

25. The wheel assembly of claim 15 additionally comprising at least one hitch bracket connected to said second cylindrical member.

* * * * *